(12) United States Patent
Mikiya et al.

(10) Patent No.: US 7,549,445 B2
(45) Date of Patent: Jun. 23, 2009

(54) FEMALE COUPLING MEMBER OF A PIPE COUPLING

(75) Inventors: Toshio Mikiya, Tokyo (JP); Takuya Nishio, Tokyo (JP); Kohji Matsumoto, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 542 days.

(21) Appl. No.: 10/520,206

(22) PCT Filed: Jun. 27, 2003

(86) PCT No.: PCT/JP03/08170

§ 371 (c)(1),
(2), (4) Date: Jan. 17, 2006

(87) PCT Pub. No.: WO2004/003419

PCT Pub. Date: Jan. 8, 2004

(65) Prior Publication Data

US 2006/0118184 A1 Jun. 8, 2006

(51) Int. Cl.
*F16K 35/00* (2006.01)
*F16L 37/38* (2006.01)
*F16L 37/47* (2006.01)

(52) U.S. Cl. .............. 137/625.22; 251/149.9
(58) Field of Classification Search ............ 137/625.22; 251/149.9
See application file for complete search history.

(56) References Cited

U.S. PATENT DOCUMENTS 265,880 A * 10/1882 Shellhorn .............. 137/625.22

334,315 A * 1/1886 Walsh, Jr. .............. 137/625.22

(Continued)

FOREIGN PATENT DOCUMENTS

DE 3117935 4/1982

(Continued)

OTHER PUBLICATIONS

Translation of International Preliminary Examination Report for PCT/JP2003/008170.

(Continued)

*Primary Examiner*—John Rivell
(74) *Attorney, Agent, or Firm*—Brinks Hofer Gilson & Lione

(57) ABSTRACT

A female coupling member of a pipe coupling is provided which has a fluid passage and a vale therein. The fluid passage is separated by the valve into a first-end side adapted to be connected to a conduit and a second-end side adapted to be connected to a male coupling member. The valve is moveable between an open position for permitting a fluid to flow between the first-end side and the second-end side, and a closed position for blocking the flow of fluid. The valve is provided with a purge flow path that allows the second end side of the fluid passage to communicate with the outside when the valve is in the closed position, and that blocks the communication between the fluid passage and the outside when the valve is in the open position. Thus, the present invention simplifies the purge mechanism of the female coupling member which releases the fluid pressure remaining within the fluid passage when the valve is in the closed position.

4 Claims, 10 Drawing Sheets

U.S. PATENT DOCUMENTS

| | | | | |
|---|---|---|---|---|
| 1,481,180 A | * | 1/1924 | Bowlus | 137/625.22 |
| 2,944,566 A | * | 7/1960 | Modrin | 137/625.22 |
| 3,186,436 A | * | 6/1965 | Modrin | 137/625.22 |
| 3,423,063 A | * | 1/1969 | German | 251/149.9 |
| 3,437,106 A | * | 4/1969 | Leopold, Jr. et al. | 137/625.22 |
| 3,618,892 A | * | 11/1971 | Sciuto, Jr. | 251/149.9 |
| 3,684,241 A | * | 8/1972 | Hartmann et al. | 137/625.22 |
| 4,397,445 A | | 8/1983 | Burquier | |
| 4,552,333 A | * | 11/1985 | Niemi | 251/149.9 |
| 5,129,621 A | * | 7/1992 | Maiville et al. | 251/149.9 |
| 5,148,839 A | | 9/1992 | Kirwan et al. | |
| 5,413,309 A | * | 5/1995 | Giesler | 251/149.9 |
| 6,089,539 A | | 7/2000 | Kouda | |
| 7,306,007 B2 | * | 12/2007 | Matsumoto | 137/614.06 |

FOREIGN PATENT DOCUMENTS

| | | |
|---|---|---|
| JP | H08-082395 A | 3/1996 |
| JP | H08-170779 A | 7/1996 |
| JP | H10-038170 | 2/1998 |
| WO | WO 89/11059 A1 | 11/1989 |

OTHER PUBLICATIONS

Office Action issued Feb. 20, 2007 in Japanese Patent Application No. 2003-133618.

German Office Action dated Jun. 1, 2006.

German Office Action issued Oct. 8, 2008 in German patent application No. 103 92 868.5-24 (with translation).

* cited by examiner

[Fig.1]
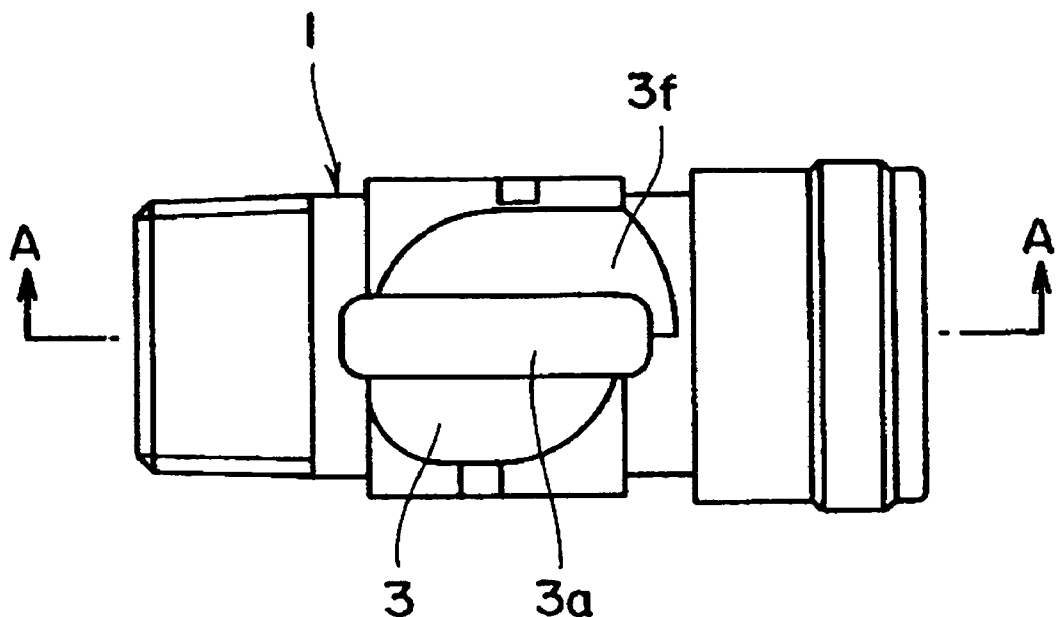
[Fig.2]
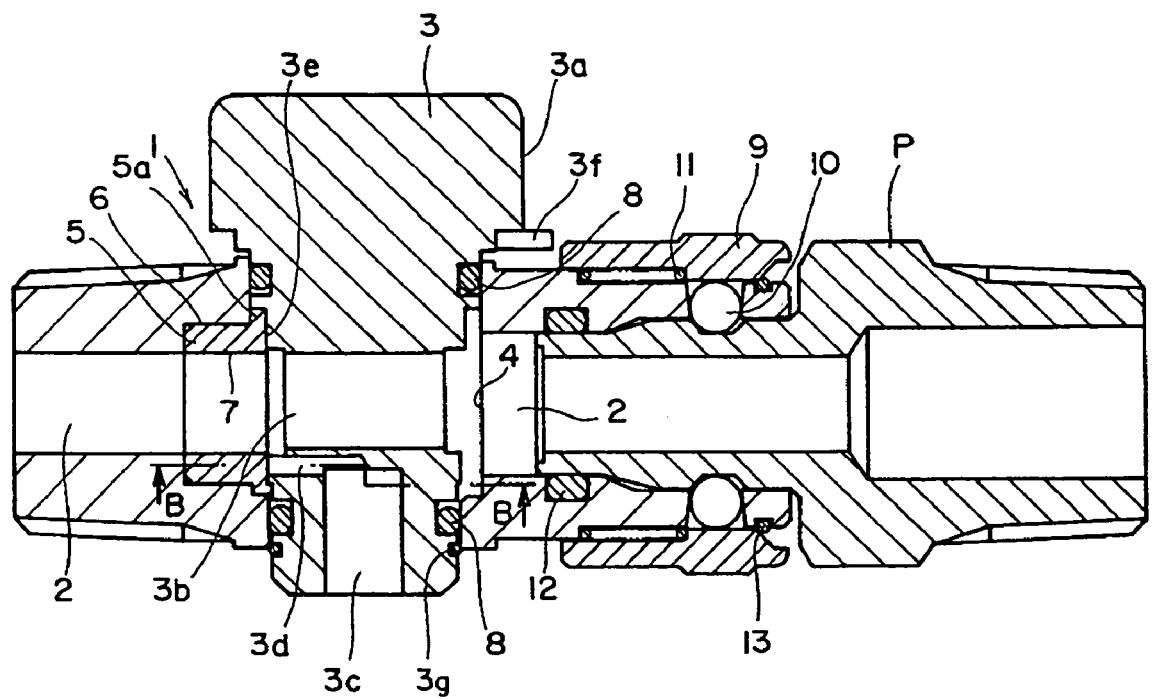

[Fig.3]
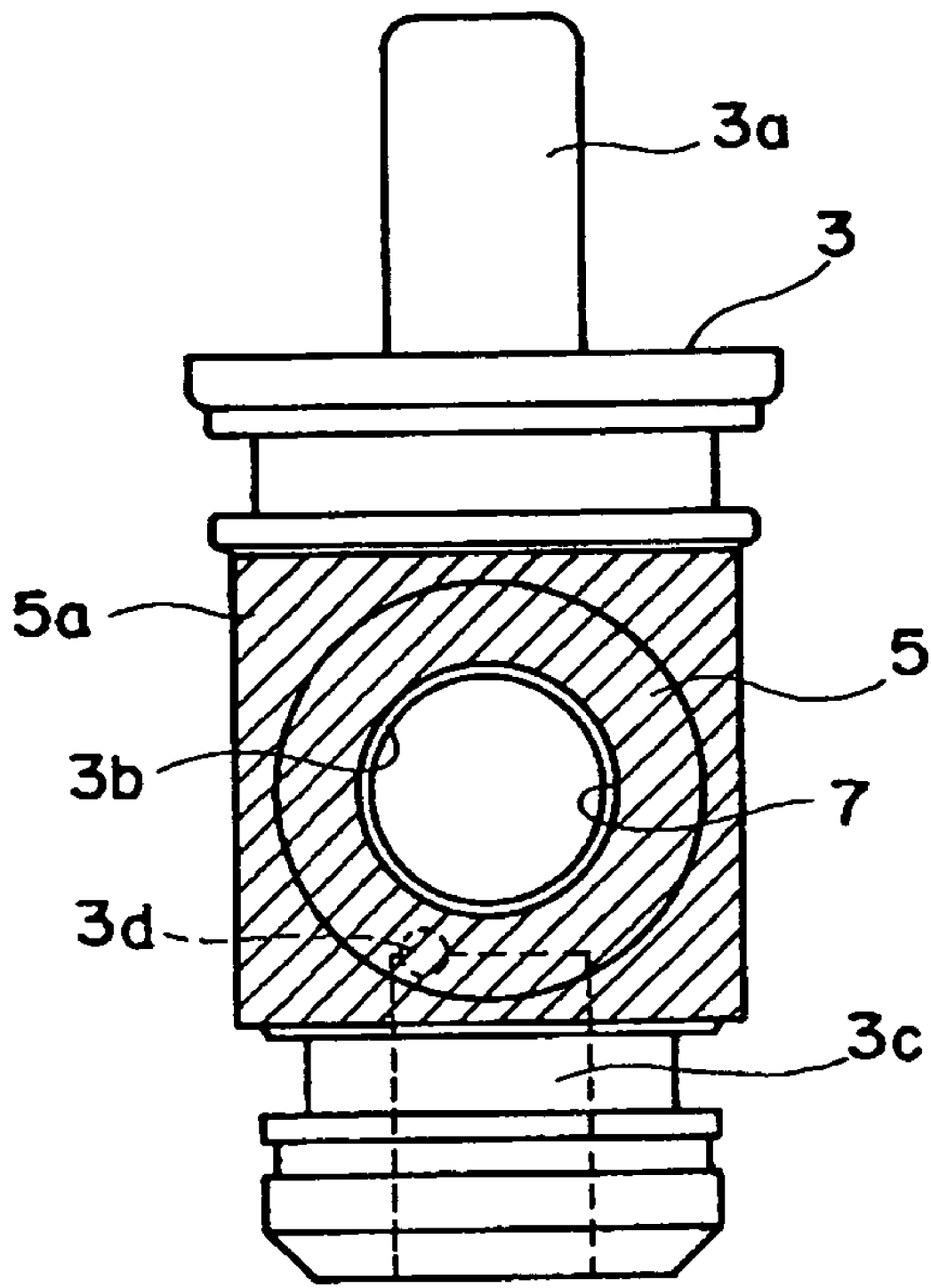

[Fig.4]
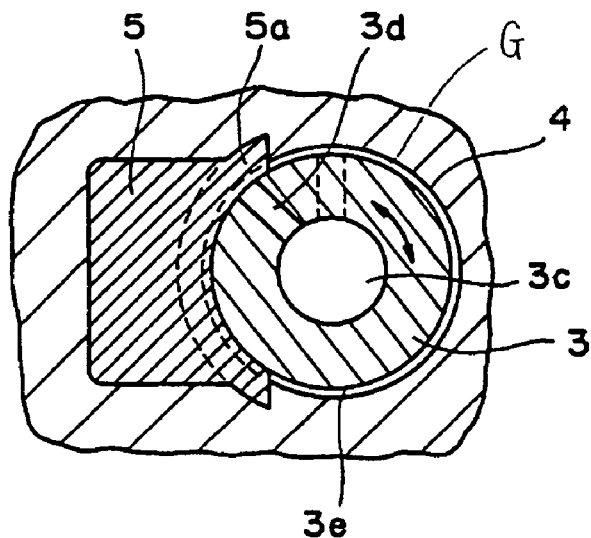
[Fig.5]
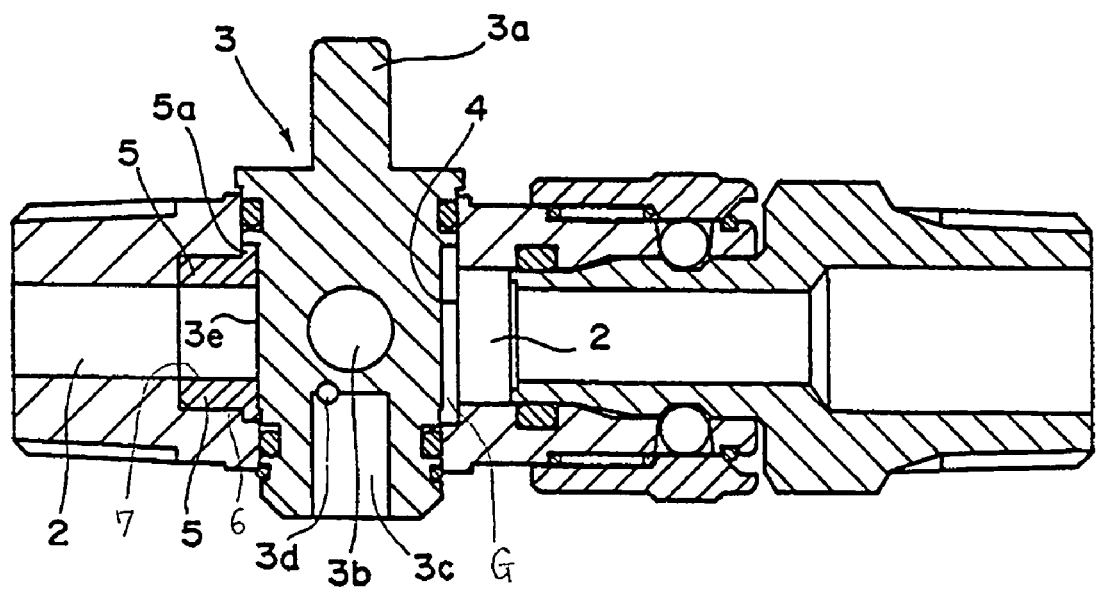

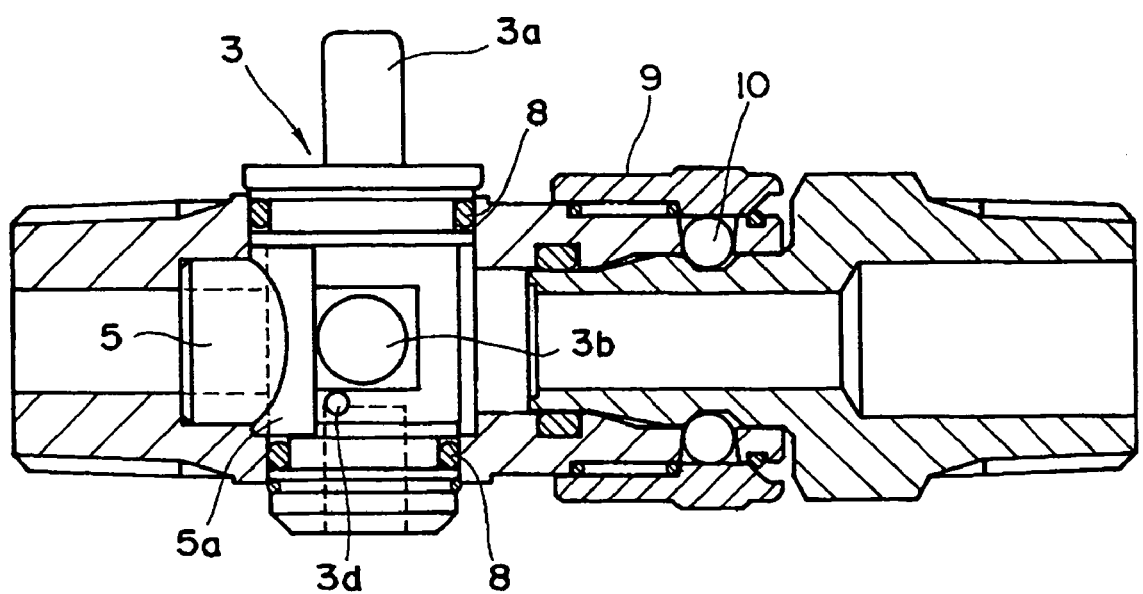
[Fig.6]

[Fig.7]
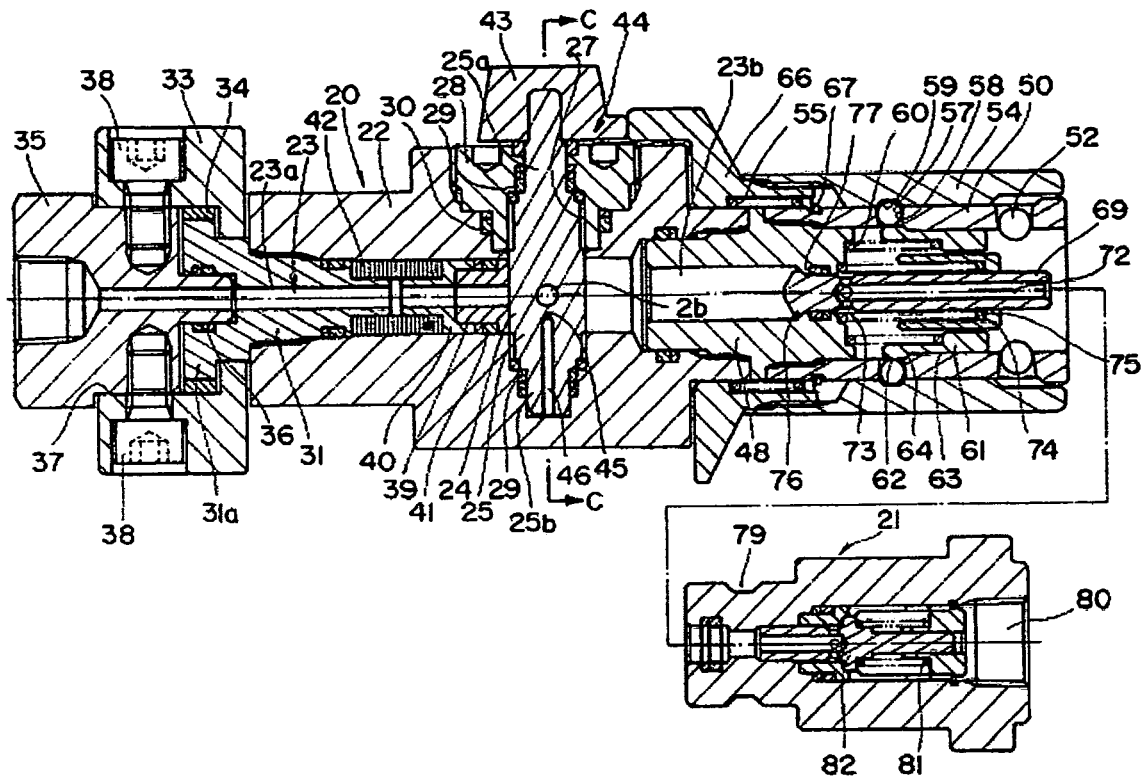
[Fig.8]
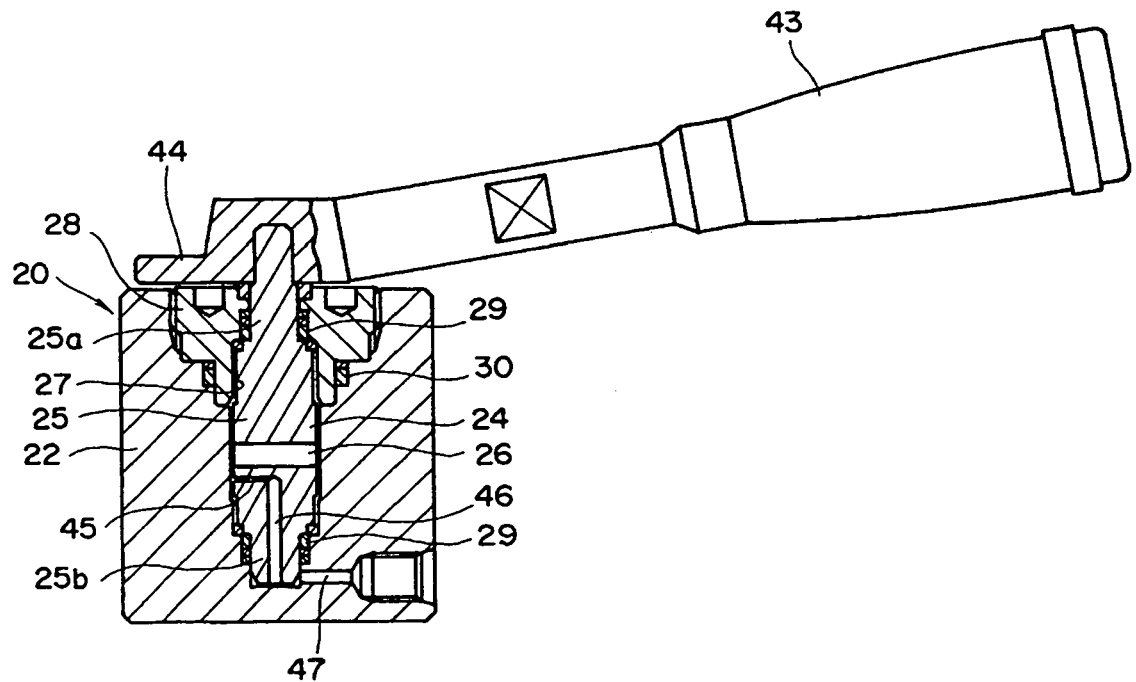

[Fig.9]
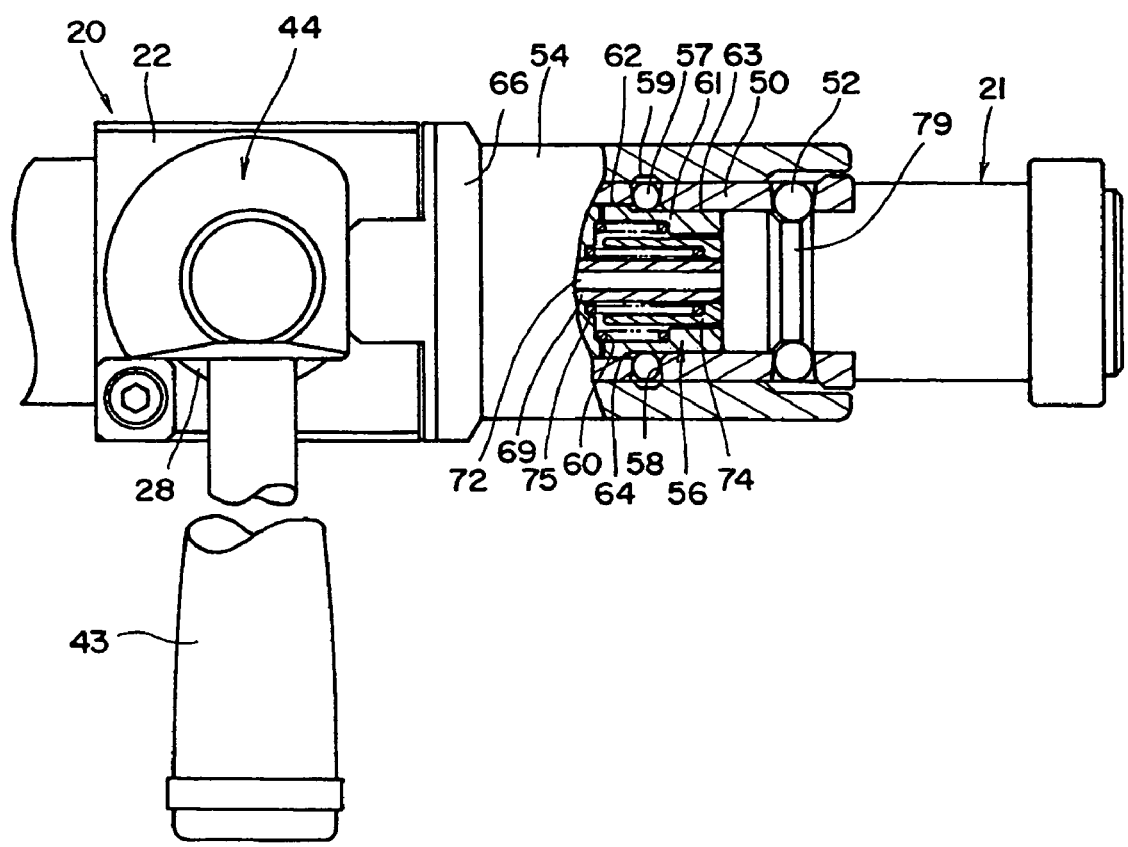

[Fig.10]
(A)
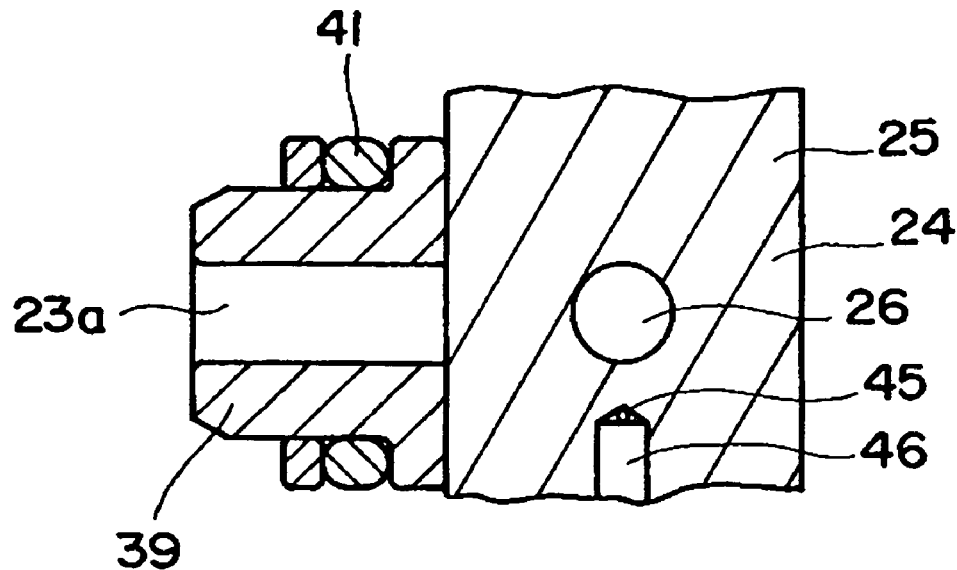
(B)
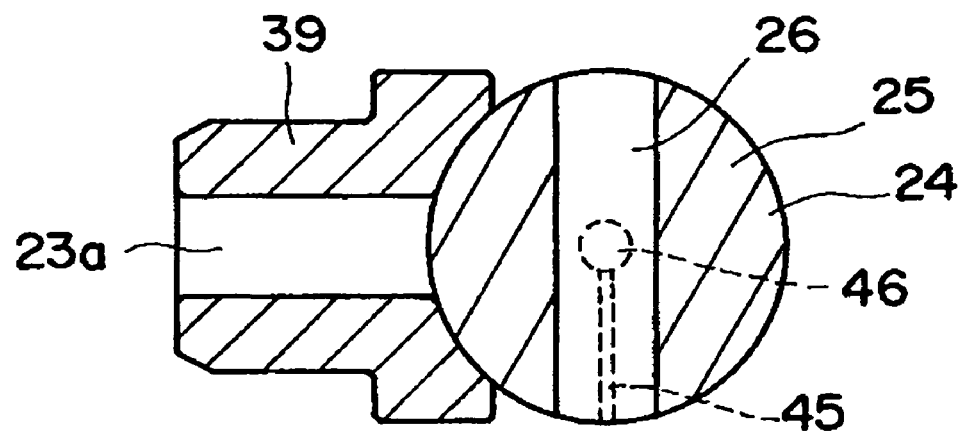

[Fig.11]
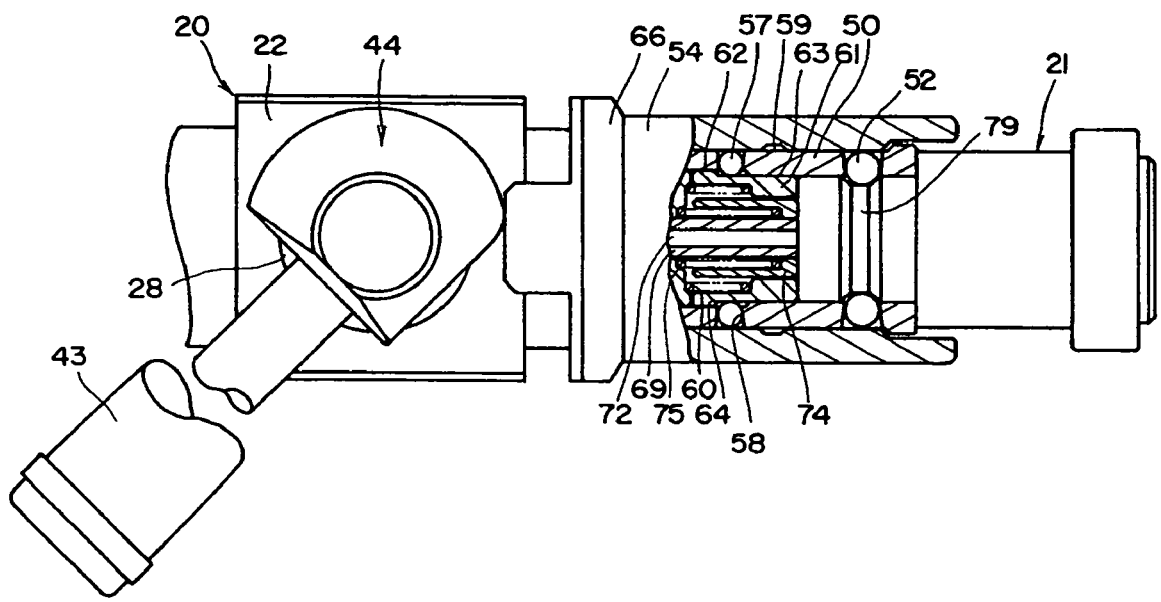
[Fig.12]
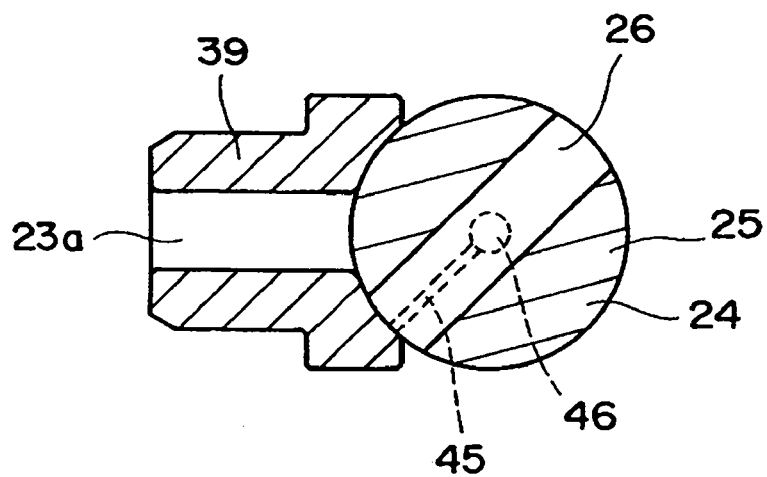

[Fig. 13]
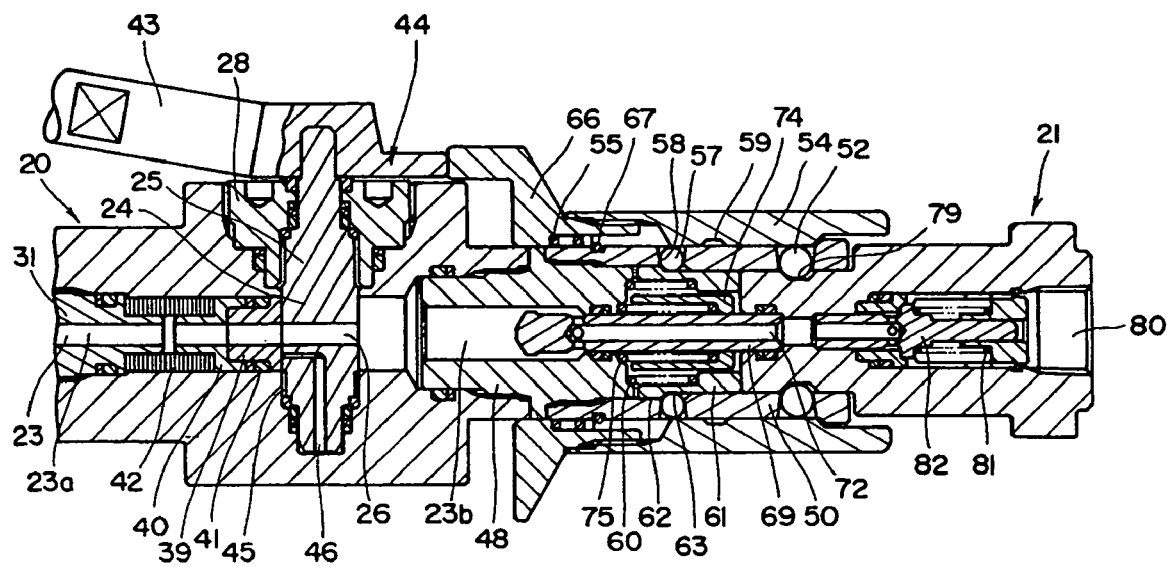
[Fig. 14]
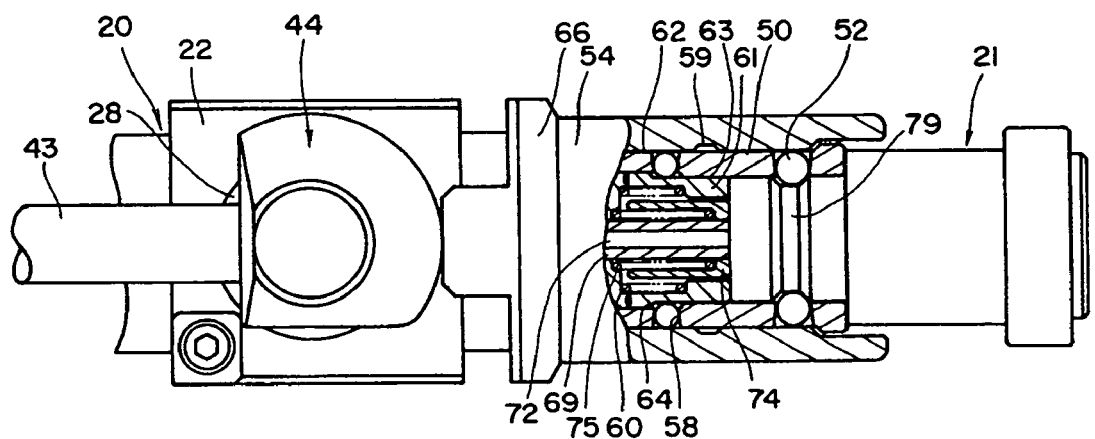

[Fig.15] PRIOR ART
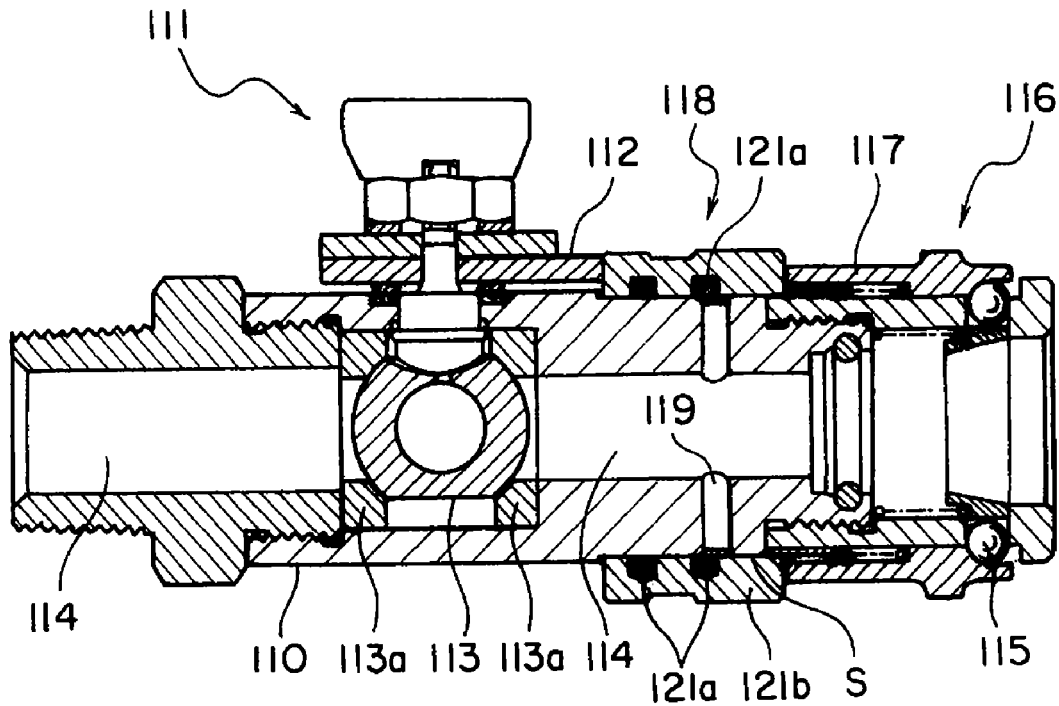
[Fig.16] PRIOR ART
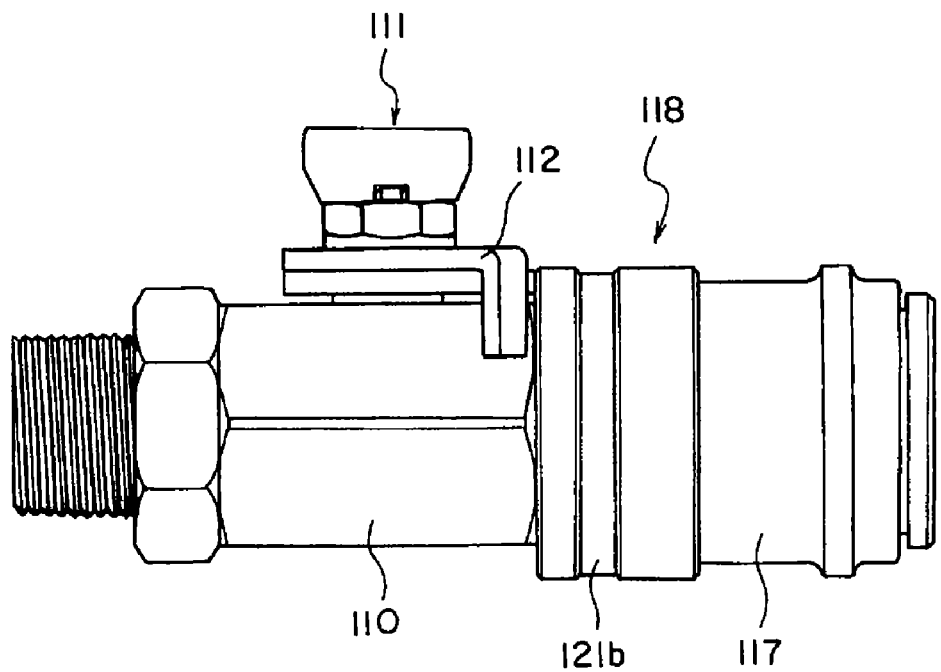

FEMALE COUPLING MEMBER OF A PIPE COUPLING

BACKGROUND OF THE INVENTION

1. Field of the Invention

The present invention relates to a pipe coupling, and more specifically relates to a pipe coupling that has a small number of parts, is easy to assemble and is provided with simplified flow adjustment and residual pressure removal functions.

FIG. 15 is a longitudinal cross section of a female coupling member of a conventional type of this pipe coupling, where FIG. 16 is a side view of this coupling member.

2. Description of the Background Art

This female coupling member is provided with a coupling body 110 that has a fluid passage 114, such that it is inserted into and connected to a male coupling member (not shown) at the right side when seen in the drawing.

The coupling body 110 has a valve mechanism 111 provided with a valve 113 that opens or closes the fluid passage 114, a connecting mechanism 116 that maintains the state of connection to the male coupling member, and a fluid pressure purging mechanism 118 provided with a purge passage 119 for purging the fluid pressure within the fluid passage 114 in the interior of the male coupling member.

The valve 113 is spherical overall, being supported by valve seats 113a, 113a. When this valve is in the position shown in the drawing, the valve hole 113b provided thereon is turned away from the fluid passage 114, so the valve is closed. When the valve is rotated by 90° from the position shown in the drawing, the valve hole is aligned to the fluid passage 114 so the valve is open. Thus, it is possible to adjust the flow of the fluid flowing through the fluid passage by adjusting the rotary position of the valve.

The connecting mechanism 116 has a locking member (locking ball) 115 and a sleeve 117. The locking member engages an engaging groove on the outside surface of the male coupling member inserted into the interior of the male coupling member, thus securing (locking) the male coupling member to the female coupling member. The sleeve 117 is able to move between a position that permits the locking member 115 to assume a position on the outside in the radial direction (unlocked position) shown in the drawing, and a position that holds the locking member from the outside in the radial direction, when the male coupling member is inserted into the interior of the female coupling member while pushing in the locking member support member 120, and when the locking member 115 engages the engaging groove of the male coupling member and moves to the inside position in the radial direction (locked position), thus moving toward the right side from the illustrated position.

The purge mechanism has a sleeve 121b that contacts the sleeve 117 of the connecting mechanism. A pair of sealing rings 121a provided on the inside surface of the sleeve 121b are positioned on either side of the outlet of the purge passage 119 on the outside in the radial direction, and are able to move between a position that blocks the fluid pressure within the fluid passage 114 from being released into the outside, and a position to the left of this position, which is a position that permits the fluid pressure within the fluid passage 114 to pass through a gap S between the sleeve 117 and coupling body 110 and be released outside.

The valve mechanism 111 is provided with a cam 112 that rotates together with the valve, and this cam controls the connecting mechanism 116, sealing ring support 118 and this valve mechanism. When the valve 113 is in the closed state as illustrated in the drawing, the connecting mechanism 116 is such that the locking member 115 is in the outside position in the radial direction (locked position), thus permitting the male coupling member to be inserted into or withdrawn from the female coupling member, and also the purge mechanism 118 allowing the fluid pressure from the fluid passage 114 to be released into the outside. In this state, the sleeve 117 engages the locking member 115, so the valve cannot be rotated (namely, the cam cannot move the sleeve 121b and sleeve 117 to the right). If the male coupling member is inserted in this state, the locking member 115 can be moved to the inside position in the radial direction (unlocked position), and if the valve 113 is rotated to the open state, the cam 112 pushes the sleeve 121b and sleeve 117 so that the purge passage 119 of the purge mechanism 118 is blocked by the sealing rings 112a, 112a, and at the same time, the sleeve 117 secures the locking member 115 in the locked position. Conversely, when the valve 113 is returned to the closed state, the sleeve 121b is moved to the left by a spring 124 located between it and the sleeve 117 and returned to the position of FIG. 15, so the fluid pressure within the fluid passage can be released through the purge mechanism 118 and the connection to the male coupling member can be released.

These mechanisms are intended to maintain safety during the connection and disconnection of the male coupling members, but their structure is complex and they have various accompanying problems.

There are couplings that have similar structures used on supply lines for high-pressure fluids, but in this case, valves are provided on both the fluid intake-side end and fluid discharge-side end (male coupling member connection side) of the fluid passage of the male coupling member, but the structure becomes even more complex (see Japanese Patent No. 2694302, for example).

SUMMARY OF THE INVENTION

The present invention was made in consideration of the aforementioned problems with conventional pipe couplings.

The present invention provides a female coupling member in a pipe coupling having a female coupling member and a male coupling member that is inserted into and connected to the female coupling member, where the female coupling member comprises:

a fluid passage that has a first end for connecting to a conduit and a second end for connecting to the male coupling member, and a valve, provided within the fluid passage, that is moveable between an open position that permits the flow of a fluid between the first-end side and the second-end side of the fluid passage, and a closed position that blocks the flow of fluid, and wherein, the valve is provided with a purge flow path that allows the second-end side of the fluid passage to communicate with the outside when the valve is in the closed position, and that is closed when the valve is in the open position.

This female coupling member has the purge flow path provided in the valve body of the valve, so the fluid pressure remaining within the fluid passage is released by merely moving this valve from the open state to the closed state, so operation is simplified and the structure of the female coupling member is also simplified.

This female coupling member more specifically comprises:

a valve body mounting hole provided such that it crosses the fluid passage, and a gasket having a through hole aligned with and communicating with the fluid passage formed on the peripheral wall surface of the valve body mounting hole. The valve body is cylindrical in shape, is mounted coaxially within the valve body mounting hole, is rotatable about its centerline between the open position and closed position, and has an outside peripheral surface that slides in tightly sealing contact with the gasket while rotating between the open position and closed position. The purge flow path has an inside opening at one end that is open to the outside peripheral surface and an outside opening at the other end that communicates to the outside of the pipe coupling, where the inside opening is closed by tightly sealing engagement to the gasket when the valve body is in the open position, but is released from this tightly sealing engagement when the valve body is in the closed position, and thus communicates with the second-end side of the fluid passage.

More specifically, the valve body mounting hole has a circular cross section and is mounted so as to be perpendicular to the fluid passage. A pair of openings is formed in the peripheral wall surface of the valve body mounting hole with the fluid passages crossing. The gasket has a through hole which aligns to and communicates with one of the pair of openings and a sealing engaging area which extends on the peripheral wall surface around the through hole. The sealing engaging area has a tightly sealing engagement surface in the shape of an arc centered about the axis of the valve body mounting hole. The outside peripheral surface of the valve body has a diameter such that it slides in tightly sealing engagement with the tightly sealing engagement surface of the gasket. A gap is formed between the outside peripheral surface and the peripheral wall surface of the valve body mounting hole and the sealing engaging area of the gasket is positioned on the gap, and the other of the pair of openings is in communication with the gap. The valve body has a valve hole that passes through the valve body extending in the direction of the diameter perpendicular to the axis of the valve body, and opens on the outside peripheral surface of the valve body, the valve hole communicates with the through hole of the gasket when the valve body is in the open position, and the communication with the through hole is cut off when the valve body is in the closed position, and the inside opening of the purge flow path is blocked by the tightly sealing engagement surface of the gasket when the valve body is in the open position, and the engagement with the tightly sealing engagement surface is removed when the valve body is in the closed position, being open to a position communicating with the gap.

One embodiment comprises:

a hole formed such that it passes in a radial direction through the peripheral wall of the female coupling member that demarcates the flow path on the second-end side, a locking member that is mounted within the hole, that is moveable in the radial direction of the female coupling member, and that can be displaced between:

a locked position that engages the male coupling member inserted within the female coupling member and secures the male coupling member to the female member, and an unlocked position where the engagement with the male coupling member is released and the securing of the male coupling member to the female coupling member is released, a sleeve that is slidably mounted to the outside periphery of the peripheral wall of the male coupling member, being a sleeve able to slide between:

a first position where the locking member is pushed inward in the radial direction and the locking member is put into the locked position, and a second position where the pushing of the locking member is released toward the side of the valve in comparison to the first position, thus permitting the locking member to assume the unlocked position, a spring that urges the sleeve toward the first position, a cam attached to the valve, which is a cam such that when a male coupling member is inserted into the female coupling member and the sleeve is in the first position, when the valve body is moved from the closed position to the open position, it engages the sleeve and blocks the sleeve from being put into the second position.

In this female coupling member, when the valve body of the valve is in the open position, the sleeve is prevented from moving to the second position, so it is possible to eliminate the risk of the male coupling member coming off when the valve is in the open position.

Another embodiment comprises:

a first hole formed such that it passes in a radial direction through the peripheral wall of the female coupling member that demarcates the flow path on the second-end side, a locking member that is mounted within the first hole, that is moveable in the radial direction of the female coupling member, and that can be displaced between:

a locked position that engages the male coupling member inserted within the female coupling member and secures the male coupling member to the female coupling member, and an unlocked position where the engagement with the male coupling member is released and the securing of the male coupling member to the female coupling member is released, a sleeve that is slidably mounted to the outside periphery of the peripheral wall of the male coupling member, being a sleeve able to slide between:

a first position where the locking member is pushed inward in the radial direction and the locking member is put into the locked position, and a second position where the pushing of the locking member is released toward the side of the valve in comparison to the first position, thus permitting the locking member to assume the unlocked position, a first spring that urges the sleeve toward the second position, a second hole formed such that it passes in a radial direction through the peripheral wall of the female coupling member, a securing member that is mounted within the second hole such that it is moveable in the radial direction, and that can be moved between:

a secured position that engages the sleeve when at the second position and blocks the sleeve from moving to the first position, and an unsecured position where it is moved from the secured position toward the inside in the radial direction, permitting the sleeve to move toward the first position, a securing member holding member that is mounted within the fluid passage on the second-end side, that can be moved between:

a first position that holds the securing member in the securing position, and a second position more toward the side of the valve than the first position, that permits the securing member to assume the unsecured position, and that is a securing member holding member which, when moved by a male coupling member inserted into the female coupling member as the male coupling member is connected to the female coupling member, is put into the second position, and a second spring that urges the securing member holding member toward the first position.

With this embodiment, the male coupling member is inserted into the female coupling member and when it reaches the position of connecting to the female coupling member, the first spring automatically makes the connection between the male coupling member and female coupling member with the sleeve at the first position.

Moreover, this embodiment may further comprise:

a cam that is attached to the valve and engages the sleeve, and the cam is such that:

when the male coupling member is inserted into the female coupling member and is at a position connected to the female coupling member, when the valve body is moved from the closed position to the open position, the cam moves the sleeve from the second position to the first position against the first spring, and when the valve body is moved from the open position to the closed position, the first spring moves the sleeve from the first position to the second position, but when the male coupling member is not inserted into the female coupling member, the movement of the valve body from the closed position to the open position is prevented by the engagement of the sleeve.

Thereby, it is possible to prevent the valve from opening in the state in which no male coupling member is inserted into the female coupling member, and when the male coupling member is inserted into the female coupling member, the two members will not be disconnected unless the valve is put into the closed state, so it is possible to prevent high-pressure fluids from being sprayed out among other dangers.

BRIEF DESCRIPTION OF THE DRAWINGS

FIG. 1 is a top view of the male coupling member of the pipe coupling according to the present invention;

FIG. 2 is a cross section along A-A of FIG. 1, with a male coupling member connected to the female coupling member of FIG. 1 and the valve in the "open" state;

FIG. 3 is a left side view of the valve when the valve is in the "open" state (when the valve hole of the valve is aligned to the hole through the gasket), showing the gasket in cross section;

FIG. 4 is a cross section along B-B of FIG. 2;

FIG. 5 is a cross section similar to that of FIG. 2, but with the valve in the "closed" state;

FIG. 6 is a drawing similar to FIG. 5, with the valve not shown in section;

FIG. 7 is a longitudinal cross section of Embodiment 2 of the pipe coupling according to the present invention, showing the state before the male coupling member is connected to the female coupling member;

FIG. 8 is a cross section along C-C of FIG. 7;

FIG. 9 is a partial cutaway top view showing the state in which the male coupling member is inserted up until a position at which it can connect to the female coupling member;

FIG. 10(A) is a longitudinal cross section illustrating the relationship between the valve and cylindrical gasket of the pipe coupling in the state of FIG. 7;

FIG. 10(B) is a lateral cross section of FIG. 10(A);

FIG. 11 is a partial cutaway top view illustrating the state in which the valve is in the processes of opening with the male coupling member inserted into the female coupling member;

FIG. 12 is a lateral cross section illustrating the relationship between the valve and cylindrical gasket in the state of FIG. 11;

FIG. 13 is a longitudinal cross section illustrating the state in which the valve is open and the male coupling member is connected to the female coupling member;

FIG. 14 is a partial cutaway top view of FIG. 13;

FIG. 15 is a cross section of a conventional pipe coupling; and

FIG. 16 is a side view of FIG. 15.

DESCRIPTION OF THE PREFERRED EMBODIMENTS

Here follows a description of embodiments of the pipe coupling according to the present invention made with reference to the appended drawings.

FIGS. 1-6 illustrate Embodiment 1 of the present invention, while FIGS. 7-14 illustrate Embodiment 2.

The pipe coupling according to Embodiment 1 has a female coupling member 1 and a male coupling member P that is inserted into and connected to this female coupling member.

Female coupling member 1 has a fluid passage 2 that has a first end (seen at the left in the figure) for connecting to a fluid-supply conduit (not shown) and a second end for connecting to the male coupling member P. A valve body mounting hole 4 with a circular cross section is provided such that it is perpendicular to the fluid passage, and within this hole a valve 3 is mounted so as to be rotatable about the centerline of the hole. FIG. 5 illustrates a gasket provided so as to be in tightly sealing contact with valve 3, where this gasket has a through hole 7 aligned with the fluid passage 2 and is mounted in a gasket receptacle 6 provided in the fluid passage 2. This gasket has a sealing engaging area 5a that extends toward the outside in the radial direction about the center of the through hole 7, and the sealing engaging area 5a has a sealing engaging surface that is arc-shaped in the top view shown in FIG. 4 and square-shaped in the side view shown in FIG. 3, that seals and engages the cylindrical peripheral surface 3e of the valve 3.

As shown clearly in FIG. 4 and FIG. 5, the valve 3 has a large-diameter portion that has a control knob 3a at its top end and that slidably engages the valve body mounting hole 4, and a small-diameter portion therebelow that engages the sealing engaging area 5a of the gasket 5. A valve hole 3b is provided through the small-diameter portion, and when the valve is in the open position shown in FIG. 2, this valve hole 3b is aligned to the fluid passage 2 and thus the first-end side communicates with the second-end side. When the valve 3 is in the closed position shown in FIG. 5, the alignment with the fluid passage 2 is broken and the first-end and second-end sides are cut off from each other.

As clearly shown in FIG. 4, a circular gap G is formed between the small-diameter portion of the valve and the valve body mounting hole 4, so the sealing engaging area 5a of the gasket 5 elongates in this gap to engage the cylindrical peripheral surface 3e of the small-diameter portion of the valve 3. As shown in FIG. 5, the gap G communicates with the second-end side of the fluid passage 2.

The valve 3 is provided with a purge flow path that has a first flow path 3c which extends from its lower end upward to near the valve hole 3b and a second flow path 3d that extends from the upper end of this first flow path in the radial direction toward an opening on the cylindrical peripheral surface 3e in the small-diameter portion of this valve. When the valve is in the open position illustrated in FIG. 2, the second flow path 3d of this purge flow path is closed by the sealing engaging area 5a of the gasket 5 (see FIG. 3 and FIG. 4). When this valve is in the closed position illustrated in FIG. 5, the second flow path leaves the sealing engaging area of the gasket 5 and is positioned so as to communicate with the gap G (see FIG. 4).

As shown in FIG. 2 and FIG. 5, the female coupling member 1 has a locking member (locking ball) 10 and a sleeve 9 provided on the periphery of this female coupling member 1. This locking ball engages an annular engaging groove formed on the outside surface of the male coupling member P inserted within this female coupling member, thereby securing the male coupling member P to the female coupling member 1. The sleeve 9 is pushed by a spring 11 into the position shown in FIG. 2 and FIG. 5, thus keeping the locking ball in the position of engaging the annular engaging groove of the male coupling member P. When the male coupling member P is inserted into or withdrawn from the female coupling member 1, the sleeve 9 is moved to the left as seen in the figure, permitting the locking ball 10 to move to the outside in the radial direction, and allowing movement of this male coupling member in the axial direction.

As is evident from FIG. 2 and FIG. 1, a cam 3f is provided on the valve 3, and when the valve 3 is in the open position shown in FIG. 2, the cam engages the sleeve 9 and prevents the sleeve from moving to the left. Namely, when the valve is in the open position, the male coupling member P cannot be inserted into or withdrawn from the female coupling member 1. When the valve 3 is in the closed position shown in FIG. 5 and FIG. 6, the sleeve 9 is able to move to the left and accordingly the male coupling member 1 can be inserted into or withdrawn from the female coupling member 1.

In Embodiment 1, 3g and 13 indicate stop rings, while 8 and 12 indicate O-rings.

In the aforementioned pipe coupling, it is possible to remove residual pressure on the side connected to the male coupling member within the fluid passage 2 by merely putting the valve 3 into the closed state.

Note that the valve is provided on the female coupling member in this example of a pipe coupling, but the valve may also be provided on the male coupling member.

Next, Embodiment 2 of the pipe coupling according to the present invention will be described based on FIGS. 7-14.

FIG. 7 is a longitudinal cross section showing the state before the male coupling member 21 is connected to the female coupling member 20. FIG. 8 is a cross section along C-C of FIG. 7. FIG. 9 is a partial cutaway top view showing the state in which the male coupling member is inserted up until a position at which it can connect to the female coupling member. FIG. 10(A) is a longitudinal cross section illustrating the relationship between the valve 24 and cylindrical gasket 39 in the state of FIG. 7. FIG. 10(B) is a lateral cross section of FIG. 10(A). FIG. 11 is a partial cutaway top view illustrating the state in which the male coupling member is connected to the female coupling member but the valve is not opened. FIG. 12 is a lateral cross section of the valve 24 and gasket 29 in an area of the valve hole that illustrates the relationship between the valve and cylindrical seal body in the state of FIG. 11. FIG. 13 is a longitudinal cross section illustrating the state in which the male coupling member 21 is connected to the female coupling member 20 and the valve is open. FIG. 14 is a partial cutaway top view of FIG. 14.

The female coupling member 20 and male coupling member 21 of the pipe coupling according to this Embodiment 2 have fundamentally the same structure as those of Embodiment 1 except that moveable valves 69 and 82 are provided on each.

Specifically, female coupling member 20 has: a valve 24, locking ball 52 that locks the male coupling member 21 to the female coupling member 20, sleeve 54 for holding this locking ball from the outside in the radial direction, and a cam 44 attached to the valve 24 in order to control the motion of this sleeve.

The female coupling member 20 consists of a central female coupling member body 22, a conduit connector 35 linked to the left end of this body 22 when viewed in the FIG. 7, an intermediate pipe 48 linked to the right end of this body and a tip pipe 50 linked to this intermediate pipe.

The conduit connector 35 is secured by screws 38 to a securing ring 33 that is attached to a securing pipe 31 screwed onto the body 22. In the FIGS. 34 and 36 are sealing rings.

The valve 24 is cylindrical overall, having an axial portion 25 extending up and down along the central axis, with an operating lever 43 (see FIG. 8) attached to its top end. In the illustrated example, the valve 24 is inserted from above into a valve body mounting hole 27 provided on the body 22, being mounted within this body 22 by a securing ring 28 screwed onto the large-diameter hole portion provided at the top end of this hole 27. In the figure, 29 is a sealing ring mounted around the upper small-diameter portion 25a and lower small-diameter portion 25b, while 30 is a sealing ring mounted around the securing ring 28.

In the same manner as the one in Embodiment 1, the valve 24 is provided with a valve hole 26 and purge hole. The purge hole consists of a first portion 45 extending parallel to the valve hole 26 and a second portion 46 extending along the axis of this valve (FIG. 8, FIG. 10(A), FIG. 10(B)), and the second portion 46 can communicate to a fluid recovery passage 47 formed on the body 22 as shown in FIG. 8.

The gasket 39 engaged to the outside surface of the valve 24 is mounted within the primary side (conduit connector 35 side) of the fluid passage 23 of the body 22, and pressed against the valve 24 by a cylindrical pressing body 40 urged by a spring 42 (while this is not clear in the figure, the valve 24 is slightly smaller in diameter than the valve body mounting hole 27, so the gasket 39 intrudes slightly into the valve body mounting hole 27 and contacts the outside surface of this valve).

As one can see from FIG. 12, the first portion 45 of the purge hole is blocked by this gasket prior to the valve hole 26 being aligned with the hole through the gasket 39 constituting the primary-side fluid passage 23a (namely, prior to the valve being put into the open state). In addition, the blockage by the gasket is removed after the valve hole 26 is no longer aligned with this through hole (namely, after the valve being put into the closed state), thus communicating with the secondary side of the fluid passage 23 via a minute gap between the outside surface of this valve 24 and the wall surface of the valve body mounting hole 27 surrounding the outside surface of the valve 24, and thereby, the residual pressure on this secondary side is released to the outside.

The sleeve 54 that controls the locking ball 52 is in contact with the cam 44 via a regulating tube 66 screwed onto its left-side end (see FIG. 9, FIG. 11 and FIG. 14). The regulating tube 66 is urged to the left by a compression spring 55 mounted between the regulating tube 66 and a stop ring 67 mounted on the outside surface of the tip pipe 50 of the female coupling member, and pressed toward the cam 44. The tip pipe 50 has a second locking ball 57 provided within a hole 58 through this tip pipe in the radial direction, and a collar 61 that supports the second locking ball 57 from the inside in the radial direction is provided. This collar is urged to the right by a spring 60, and a step 64 formed between the large-diameter portion 62 and the small-diameter portion 63 of the outside surface of this collar is halted by a step formed on the inside surface of the tip pipe 50. When the collar 61 is in this state, the large-diameter portion 62 of the collar engages the second locking ball 57, and a portion of this locking ball engages a halting groove 59 formed in the inside surface of the sleeve 54, and thereby this sleeve 54 is in a state fixed to the tip pipe 50.

In the figure, a moveable valve 69 is provided on the inside of the collar so that it is able to move in the axial direction of the female coupling member 20, and a pipe 74 is attached to the outside surface of this moveable valve, being urged toward the right by a spring 75 mounted between this pipe 74 and the intermediate pipe 48 of the female coupling member. A large-diameter portion 76 formed at the left tip of this moveable valve 69 engages a step 77 formed on the inside surface of the through hole of the intermediate pipe (formed on the secondary side 23b of the fluid passage 23), and thus this moveable valve is halted at the position illustrated in FIG. 7. On the moveable valve 69 are formed an axial flow path 72 and a radial flow path 73 communicating to the left end of the axial flow path.

An annular engaging groove 79 that receives the locking ball 52 at the time of connecting to the female coupling member 20 is formed on the outside surface of the male coupling member 21, and the moveable valve 82 is mounted such that it is able to move axially within its fluid passage 80. This moveable valve is urged toward the left by a spring 81, being normally in the "closed" state (namely, the state in which the fluid passage consisting of the axial flow path extending axially from the left tip surface of this moveable valve and the radial flow path communicating toward its right tip is closed). When this male coupling member 21 is inserted into and connected to the female coupling member 20, and a fluid is supplied from the fluid passage of the female coupling member, the moveable valve 82 is moved to the right against the spring 81 by the pressure of the fluid and put into the "open" state.

When this male coupling member 21 is inserted into the female coupling member 20, the tip of this male coupling member advances while pushing the collar 61 toward the left, and when the engaging groove 79 of this male coupling member is aligned with the locking ball 52 in the radial direction, the small-diameter portion 63 of the collar 61 comes to the inside of the second locking ball 57. Thereby, the state of engagement between the tip pipe 50 of the female coupling member 20 and the sleeve 54 is released, so this sleeve 54 is moveable in the axial direction. FIG. 9 illustrates this state.

Thus, when the lever 43 of the valve 24 is rotated as shown in FIG. 11, the sleeve 54 is moved to the right by the cam 44, assuming a position wherein the locking ball 52 is pressed from the outside in the radial direction. As shown in FIG. 12, in this state, the valve hole 26 of the valve 24 does not communicate with the fluid passage 23, but the purge holes 45, 46 are closed by the gasket. Moreover, as the rotation of the lever advances to the position shown in FIG. 14, the valve hole 26 of the valve 24 is aligned to the fluid passage 23 so that this pipe coupling is in the open state.

Conversely, if the lever 43 is rotated in the direction opposite to that described above from this open state, then the valve hole 26 is moved away from the fluid passage 23 so this pipe coupling is put into the closed state, and if the lever rotation advances further, the purge hole is moved away from the gasket and put into the releasing state, and ultimately, as the cam 44 takes the position shown in FIG. 9, the sleeve 54 is returned to the position shown in FIG. 7 by the compression spring 55. Accordingly, the male coupling member 21 can be withdrawn from the female coupling member 20 and together with this withdrawal, the collar 61 moves to the right, moving the second locking ball 57 to the halting position with the halting groove 59 of the sleeve 54.

What is claimed is:

1. A female coupling member in a pipe coupling having a female coupling member and a male coupling member that is inserted into and connected to said female coupling member, said female coupling member comprising:
   a fluid passage that has a first end for connecting to a conduit and a second end for connecting to the male coupling member;
   a valve, provided within said fluid passage, that is moveable between an open position that permits the flow of a fluid between the first-end side and the second-end side of said fluid passage, and a closed position that blocks the flow of fluid, wherein said valve is provided with a purge flow path that allows said second-end side of said fluid passage to communicate with the outside when said valve is in said closed position, and that is closed when said valve is in said open position;
   a valve body mounting hole provided so as to cross said fluid passage; and
   a gasket having a through hole aligned with and communicating with said fluid passage,
   wherein said valve body is cylindrical in shape, is mounted coaxially within said valve body mounting hole, is rotatable about its centerline between said open position and closed position, and has an outside peripheral surface that slides in tightly sealing contact with said gasket while rotating between said open position and closed position,
   said purge flow path has an inside opening at one end that is open to said outside peripheral surface and an outside opening at the other end that communicates to the outside of said pipe coupling, where said inside opening is closed by tightly sealing engagement to said gasket when said valve body is in said open position, but is released from this tightly sealing engagement when said valve body is in said closed position, and thus communicates with the second-end side of said fluid passage,
   said valve body mounting hole has a circular cross section and is mounted so as to be perpendicular to said fluid passage,
   a pair of openings are formed in the peripheral wall surface of said valve body mounting hole with said fluid passages crossing,
   said gasket is such that said through hole thereof aligns to and communicates with one of said pair of openings, and has a tightly sealing engagement surface in the shape of an arc centered about the axis of the valve body mounting hole,
   said outside peripheral surface of said valve body has a diameter so as to slide in tightly sealing engagement with said tightly sealing engagement surface of said gasket,
   a gap is formed between said outside peripheral surface and the peripheral wall surface of said valve body mounting hole, and the other of said pair of openings is in communication with said gap,
   said valve body has a valve hole that passes through said valve body extending in the direction of the diameter perpendicular to the axis of said valve body, and opens on said outside peripheral surface of said valve body,
   said valve hole communicates with the through hole of said gasket when said valve body is in said open position, and the communication with said through hole is cut off when said valve body is in said closed position, and said inside opening of the purge flow path is blocked by the tightly sealing engagement surface of said gasket when said valve body is in said open position, and the engagement with said tightly sealing engagement surface is removed when said valve body is in said closed position, being open to a position communicating with said gap.

2. A female coupling member according to claim 1, further comprising:

a hole formed such that it passes in a radial direction through the peripheral wall of said female coupling member that demarcates the flow path on the second-end side;

a locking member that is mounted within said hole, that is moveable in the radial direction of said female coupling member, and that can be displaced between a locked position that engages the male coupling member inserted within said female coupling member and secures said male coupling member to said female coupling member, and an unlocked position where the engagement with said male coupling member is released and , thus, the securing of said male coupling member to said female coupling member is released;

a sleeve that is slidably mounted to the outside periphery of the peripheral wall of said male coupling member, said sleeve being slidable between a first position where said locking member is pushed inward in the radial direction and said locking member is put into said locked position, and a second position where the pushing of said locking member is released toward the side of said valve in comparison to said first position, thus permitting said locking member to assume said unlocked position;

a spring that urges said sleeve toward said first position; and a cam attached to said valve, said cam being adapted to engage said sleeve and block said sleeve from being moved to said second position when said male coupling member is inserted into said female coupling member and said sleeve is in said first position, when said valve body is moved from said closed position to said open position.

3. A female coupling member according to claim 1, further comprising:

a first hole formed so as to pass in a radial direction through the peripheral wall of said female coupling member that demarcates the flow path on said second-end side;

a locking member that is mounted within said first hole, that is moveable in the radial direction of said female coupling member, and that can be displaced between a locked position that engages the male coupling member inserted within said female coupling member and secures said male coupling member to said female member, and an unlocked position where the engagement with the male coupling member is released and the securing of the male coupling member to the female coupling member is released;

a sleeve that is slidably mounted to the outside periphery of the peripheral wall of said male coupling member, said sleeve being slidable between a first position where said locking member is pushed inward in the radial direction and said locking member is put into said locked position, and a second position where the pushing of said locking member is released toward the side of said valve in comparison to said first position, thus permitting said locking member to assume said unlocked position;

a first spring that urges said sleeve toward said second position;

a second hole formed so as to pass in a radial direction through said peripheral wall of said female coupling member;

a securing member that is mounted within said second hole so as to be moveable in the radial direction, said securing member being movable between a secured position that engages said sleeve when at said second position and blocks said sleeve from moving to said first position, and an unsecured position where said securing member is moved from said secured position toward the inside in the radial direction, permitting said sleeve to move toward said first position;

a securing member holding member that is mounted within the fluid passage on said second-end side, that can be moved between a first position that holds said securing member in said securing position, and a second position more toward the side of said valve than said first position, that permits said securing member to assume said unsecured position;

said securing member being moved to said second position, when moved by a male coupling member inserted into said female coupling member as the male coupling member is connected to said female coupling member; and a second spring that urges said securing member holding member toward said first position.

4. A female coupling member according to claim 3, further comprising:

a cam that is attached to said valve and engages said sleeve, and said cam is such that:

when said male coupling member is inserted into said female coupling member and is at a position connected to said female coupling member, when said valve body is moved from said closed position to said open position, said cam moves said sleeve from said second position to said first position against said first spring, and when said valve body is moved from said open position to said closed position, said first spring moves said sleeve from said first position to said second position, but when said male coupling member is not inserted into the female coupling member, the movement of said valve body from said closed position to the open position is prevented by the engagement of said sleeve.

* * * * *

UNITED STATES PATENT AND TRADEMARK OFFICE
CERTIFICATE OF CORRECTION

PATENT NO.         : 7,549,445 B2
APPLICATION NO. : 10/520206
DATED                 : June 23, 2009
INVENTOR(S)        : Toshio Mikiya et al.

It is certified that error appears in the above-identified patent and that said Letters Patent is hereby corrected as shown below:

On the Title Page

Item (57), line 2, under "ABSTRACT", replace "vale" with --valve--.

In the Claims

In column 11, claim 2, line 23, after "is released", replace "and , thus," with --and thus,--.

Signed and Sealed this

Twenty-seventh Day of October, 2009

David J. Kappos
*Director of the United States Patent and Trademark Office*